United States Patent [19]
Dodds et al.

[11] Patent Number: 5,333,785
[45] Date of Patent: Aug. 2, 1994

[54] WIRELESS IRRIGATION SYSTEM

[76] Inventors: Graeme C. Dodds, 2 Frensham Place, Dural, Australia, 2158; Peter G. McNeil, 18 Darmody Street, Weetangera, Australia, 2614

[21] Appl. No.: 992,914

[22] Filed: Dec. 18, 1992

[30] Foreign Application Priority Data

Dec. 19, 1991 [AU] Australia .................. PL0120

[51] Int. Cl.⁵ .................................................. B05B 12/04
[52] U.S. Cl. ........................................ 239/69; 239/67; 239/DIG. 15
[58] Field of Search ............... 239/67, 69, 68, DIG. 15

[56] References Cited

U.S. PATENT DOCUMENTS

| | | | |
|---|---|---|---|
| 4,185,650 | 1/1980 | Neves et al. | 239/69 X |
| 4,396,149 | 8/1983 | Hirsch | 239/69 X |
| 4,760,547 | 7/1988 | Duxbury | 239/69 X |
| 4,838,310 | 6/1989 | Scott et al. | 239/69 X |
| 4,852,802 | 8/1989 | Iggulden et al. | 239/69 X |
| 5,048,755 | 9/1991 | Dodds | 239/69 X |

*Primary Examiner*—Andres Kashnikow
*Assistant Examiner*—William Grant
*Attorney, Agent, or Firm*—Merchant, Gould, Smith, Edell, Welter & Schmidt

[57] ABSTRACT

An irrigation system for controlling a number of control valves (104) is disclosed. The valves (104) control the flow of water in a corresponding branch pipe (102) leading from a common supply pipe (101). The system uses wireless transmission of control signals to operate a control unit (115) which operates the corresponding control valve (104) from a corresponding power generator (107). The control signal is encoded by an encoder (118) according to predetermined conditions and is decoded by each of the control units (115), the coded signal being received by each control unit (115) and the specified control unit (115) operating only.

10 Claims, 2 Drawing Sheets

WIRELESS IRRIGATION SYSTEM

The present invention relates to irrigation systems for controlling the operation of a number of control valves each of which in turn controls the flow of water in a corresponding branch pipe leading from a common supply pipe. U.S. Pat. 5,048,755 by the same applicant describes a system comprising a pair of control lines which extend along the Supply pipe and branch pipes to carry a control signal to operate a control unit which then in turn operates a corresponding control valve using a low voltage power supply. The control signal is coded by a data generator according to predetermined conditions and is decoded by each of the control units, the codes being received at each control unit, and the specified control unit operating only.

The system as described in that patent specification resulted in the number of wires, and particularly the number of power wires which carry a relatively high current, being reduced.

Through further development of the system, it has been found that it is desirable to remove all control and power wiring in irrigation water management systems that are normally buried in the ground. This provides more flexibility and control over the system as there is a lower capital cost as well as a lower installation cost if the control and power wiring is removed.

It is an object of the present invention to provide an improved irrigation system that provides total water management and in which control and power wiring is removed.

According to one aspect of the present invention there is disclosed wireless irrigation system for controlling the operation of a plurality of control valves each of which controls the flow of water in a corresponding branch pipe leading from a common supply pipe, said system being characterized by a control data generator, a plurality of control units and a plurality of power generating means corresponding to each of said control valves and being located adjacent thereto, said control units being connected to the corresponding control valve and to the corresponding power generating means, and including decoding means to detect data transmitted from said control data generator which identifies a predetermined one of said control units, and switch means activatible by said decoding means to connect said control valve and said power generating means to operate said corresponding control valve.

One embodiment of the present invention will now be described with reference to the drawings in which.

Figure 1:
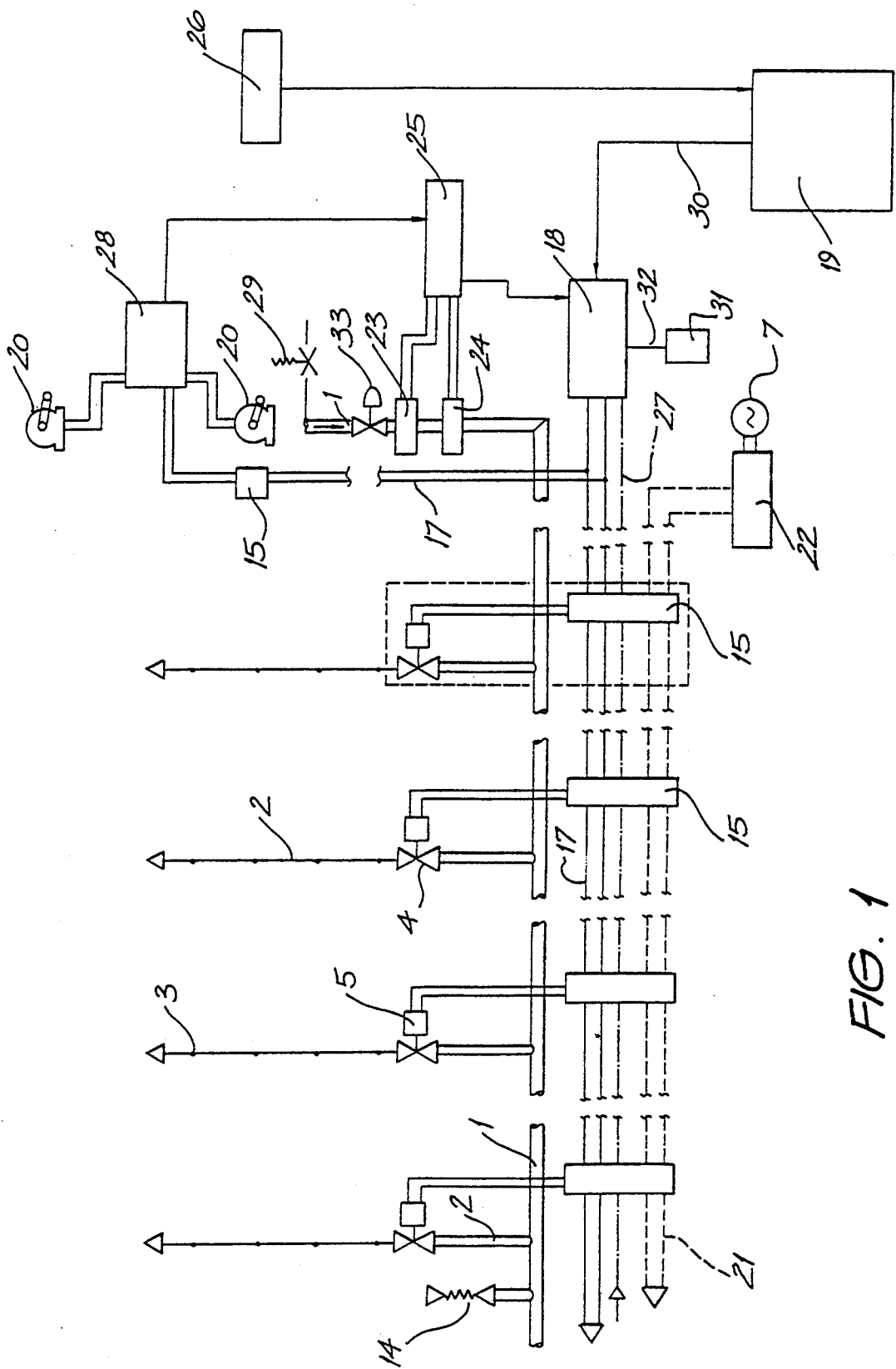
FIG. 1 is a schematic diagram illustrating a prior art irrigation system.

The prior art system as illustrated in FIG. 1 and as described in specification 24417/88 has a common Supply pipe 1 and has a number of branch pipes 2 each of which includes a number of sprinklers, or like water emitting devices 3, A control valve 4 is located at the head of each branch pipe 2 and is operated by a solenoid 5 or like control device. In addition, a manually operable valve 14 can also be provided and supplied from the supply pipe 1.

Directly connected with each of the solenoids 5 is a corresponding control unit 15 which, as indicated by the box illustrated in broken lines in FIG. 1, is located adjacent to the corresponding control valve 4. Each of the control Units 15 is directly connected "in parallel" to a "multi-drop" Of a control wire 17 such that each of the control units 15 receives all the information transmitted along the control wires 17 by an encoder 18 which is in turn supplied with data from a computer or central processing unit 19. In those systems where at least one pump 20 is required to produce the necessary head of pressure for the supply pipe 1, the control wires 17 also extend to an appropriate one of the control units 15 which is directly connected with the system pumps 20 via a pump control unit 28 which in turn is connected to a data acquisition unit 25.

In addition, a pair of low voltage power supply lines 21 is also connected to each of the control units 15 which are again connected in parallel. The low voltage power lines 21 are supplied from a mains supply 7 via a transformer 22. The separate use of the control wires 17 and the power lines 21 provides several features which increase the reliability of the system.

Any voltage can be applied to the valves 5 or other devices can be used in the system if required and a mixture of voltages and AC and DC current valves can be controlled from the same "multi-drop" control wire 17. The power lines 21 are electrically isolated from the control wires 17 so that the power surges do not effect the electronic circuits. The control wires 17 require very low voltage and current for data transmission and therefore only require small gauge wire that can be extended for many Kilometers from the encoder 18. The power lines 21 do not connect from the central processing unit 19 or the encoder 18 and in large systems the power is supplied from the various points in the system by a plurality of the transformers 22 thus reducing the length, size and cost of the power lines 21 while increasing the reliability and flexibility of the system.

A flow transducer 23 and a pressure transducer 24 are located in the supply pipe 1 and supply data to the data acquisition unit 25. The control unit 28 is also connected to the data acquisition unit 25. The central processing unit 19 can also be supplied with data from a weather station 26. The output of the data acquisition unit 25 is supplied to the central processing unit 19 as an input via the encoder 18. Also connected to the supply pipe 1 is a pressure sustaining valve 29 and when required a master valve 33 is fitted.

Within each of the control units 15 is a decoder (not illustrated) in order to detect which of the data transmitted along the common control wires 17 is intended for the particular control unit 15. The control unit 15 also includes a switching device (not illustrated) which is able to be activated and deactivated by the encoder to respectively turn on and off the corresponding solenoid 5.

The system as described requires that the control wires 17 extend along the supply pipe 1, the power lines 21 need only to follow the supply pipe I for a short distance.

Figure 2:
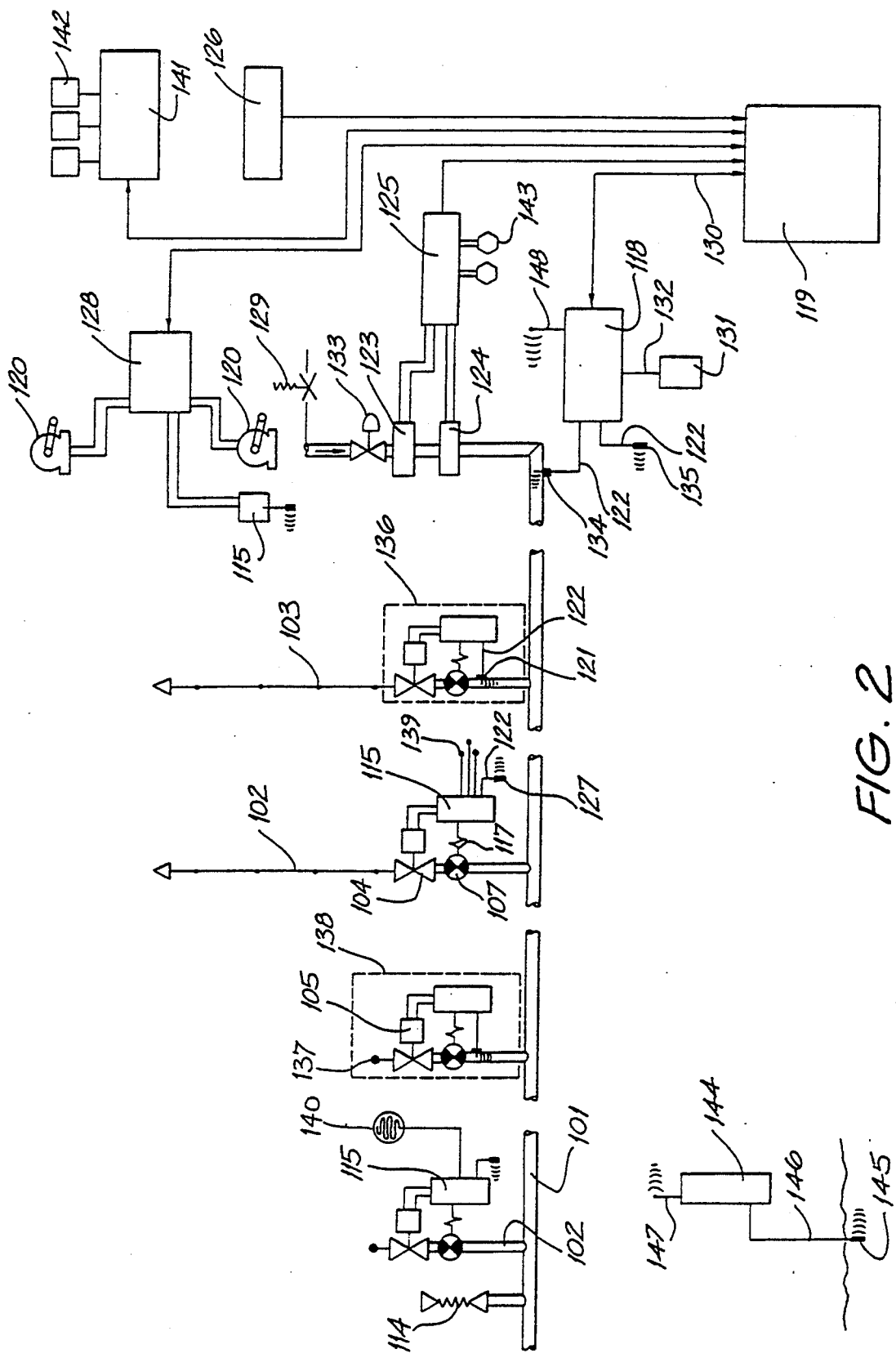
FIG. 2 is a schematic diagram illustrating the preferred embodiment of the present invention.

Turning now to FIG. 2, the preferred embodiment of the irrigation system of the present invention is schematically illustrated. A supply pipe 101, a plurality of branch pipes 102, a plurality of sprinklers 103, a plurality of control valves 104, a plurality of solenoids 105, a manual outlet 114 and an encoder 118 are substantially as previously described.

The solenoids 105 are directly connected to the valves 104. Other methods of actuation to operate the valves 104 can be used. The valves 104 are in turn connected to a corresponding plurality of control units 115. The control units 115 are "intelligent" and are connected to a power source (power generator) 107 by a (able 117. Each of the control units 115 is fitted with a rechargable power source (not illustrated) that is recharged by the power generator 107 which is located in the immediate vicinity of the control valve 104, as indicated by the box 136 illustrated in broken lines in FIG. 2.

Each of the control units 115 is able to send and receive encoded signals via a wireless transmission from the encoder 118. The encoded signals are transmitted by electromagnetic waves through the water in the pipes 101 and 102 from an aerial 134 located in the common supply pipe 101, or other suitable location, and connected to the encoder 118 by a cable 122. The signal is received by an aerial 121 fitted into each of the branch pipes 102, or other suitable location adjacent to the control unit 115, and in turn connected to the control unit 115 by the cable 122.

As an alternative, a ground aerial 135 can be used and the encoded signals transmitted via the earth and received by another ground aerial 127 located in the ground adjacent to each of the control units 115.

It is also possible that a combination of wireless methods of transmission can be used in each system. Each of the control units 115 can also transmit encoded signals back to the encoder 118 via the aerials 121 and 134 or 127 and 135, respectively.

The wireless transmissions of the preferred system are of such a nature and frequency that they will not interfere with or require a public broadcasting licence (subject to local broadcasting regulations). Each of the control units 115 is controlled locally by an internal microprocessor (not illustrated) and is fitted with non-volatile memory. The control units 115 can be programmed and reprogrammed via a sensor input and output lines 139 which can be used to send and receive analog, digital and pulsed signals.

Each of the control units 115 is able to send, log and report information independently of requests from the encoder 118 by receiving signals from the power generator 107 (which can also act as a flow sensing means) or from other sensors (not illustrated) built into or connected to each of the control units 115. Each of the control units 115 is then able to report such information at predetermined or preprogrammed intervals. Such information includes flow rate, volume pressure, moisture and other environmental factors which can be sensed and transmitted.

In addition other inbuilt sensing functions in each of the control units 115 can be used to monitor the power supply from the power generator 107 and report the power condition to a central computer 119 thus providing warnings for high or low supply problems. The system automatically adjusts the voltage and frequency of the power generator 107, detects open and Short Circuits on the control valves 104, responds to magnetic fields by way of a magnetically operated switch (not illustrated) that allows local manual operation. The system also has a function programming means and magnetic sensing input (not illustrated), which provides fall safe shut off via a "watch dog" feature that will shut down the valves 100 or other devices if the control unit 115 loses contact with the encoder 118. The control units 115 are able to be used to control other devices or are connected to sensing means (not Illustrated) to collect data Independently of the control valves 104 by a the sensor input and output lines 139 which can be used to send or receive analog digital or pulsed signals.

This allows the control units 115 to be used as data acquisition units in place of or in conjunction with a data acquisition unit 125 and in place of or in conjunction with an equipment controller 141.

The power generator 107 is able to generate power via mechanical means by using a turbine, or by vibration or friction. Other alternatives such as an auxiliary power supply can be supplied to each of the control units 115 by light or solar cell 140.

In another alternative, as illustrated in the FIG. 2, the solenoids 105, the control units 115, the power generators 107, the cables 117, the aerials 121, the cables 122, and the sensor input and output lines 39 are incorporated into the valve 104 in order to produce an "intelligent" or "smart" valve 104 as indicated in the box 136. Power can also be supplied by the light or solar cell 140 or from low voltage conductors or cables (not illustrated).

In another alternative, the valves 104, the solenoids 105, the control units 115, the power generators 107, the cables 117, the aerials 121, the cables 122 and sensor input and output lines 139 are incorporated into a sprinkler 137 in order to produce an "intelligent" or "smart" sprinkler as Indicated by a box 38. The turbine (not illustrated) used in the sprinkler to rotate the sprinkler 137 can also be used as the power generator 7 in this arrangement. It is also possible that power can be supplied by the light or solar cell 140.

The inbuilt magnetically operated switch may be used with a "Magnetic Key" to provide manual test operation of the control units 115, A number or Indicators are available which can be programmed to allow visual debugging and visual indication of the operational status of the control units 115. The control units 115 are designed to operate impulse (latching) type solenoids 105 by programming the unit 115 to produce positive or negative output pulses if required, In addition to the above, the data acquisition unit 125, a pump control unit 128, an equipment control 131 and a weather station 126 are connected to the central computer 119. The system can integrate and Control other equipment 142 such as heating and cooling units, fans and the like via the equipment controller 141. Additional sensors 143 are connected to the data acquisition unit 125.

The system is able to be remotely controlled by a portable encoding and transmission unit 144 connected to a ground aerial spike 145 by a cable 146. The ground aerial spike 145 is placed in the ground in the vicinity of the aerials 121,127,134 and 135. Conventional transmission methods can also be used for remote control via an aerial 147. The portable control unit 144 can also be used to encode and transmit data to the encoder 118 via an aerial 148. This has the advantage of providing a "voice" channel to relay instructions to the base water system manager in a digital form or by "live" voice communication.

The advantages of the present invention over the prior art which has been described include lower capital and installation costs. It is also easier to retro-fit to existing irrigation systems as well as providing increased reliability as there are no wires in the ground which are able to be broken. The system increases lightening protection is there are no wires.

The system provides that It is easier to replace and service individual components and the system is able to log or report data collected in the field to provide water management information from field data.

The foregoing describes only one embodiment of the present invention, and modifications obvious to those skilled In the art can be made thereto without departing from the scope of the present invention.

What we claim is:

1. A wireless irrigation system for controlling the operation of a plurality of control valves each of which controls the flow of water in a corresponding branch pipe leading from a common supply pipe, said system being characterised by a control data generator, a purality of control units and a plurality of power generating means corresponding to each of said control valves and being located adjacent thereto, for generating power in response to the flow of water in a corresponding branch pipe said control units being connected to the corresponding control valve and to the corresponding power generating means, and including decoding means to detect data transmitted from said control data generator which identifies a predetermined one of said control units, and switch means activatable by said decoding means to connect said control valve and said power generating means to operate said corresponding control valve, wherein said control unit has sensing means to sense operational data, and said control unit includes means for transmitting sensed operational data to said data control generator.

2. The system as claimed in claim 1 wherein the data is transmitted in encoded signals by electromagnetic radiation.

3. The system as claimed in claim 2, wherein said electromagnetic radiation travels through said common supply pipe and said corresponding branch pipes and through water located therein.

4. The system as claimed in claim 2, wherein said electromagnetic radiation travels through the air.

5. The system as claimed in claim 2, wherein said electromagnetic radiation travels through the earth.

6. The system as claimed in claim 1, wherein each corresponding said control unit, said power generating means, said decoding means, and said switch means are combined with said control valve in a single valve unit.

7. The system as claimed in claim 1, wherein each corresponding said control unit, said power generating means, said decoding means, said switch means and a water sprinkler are combined in a single sprinkler unit.

8. The system as claimed in claim 1, wherein said system is operable by remote control using a portable encoding and transmission unit.

9. The system as claimed in claim 1, wherein said operational data which is sensed is selected from the group consisting of: flow rate of the water, volume pressure of the water and moisture content in the ground.

10. The system as claimed in claim 9, wherein said power generating means acts as a flow sensing means and provides signals to a corresponding said control unit.

* * * * *